(12) United States Patent
Scott

(10) Patent No.: US 10,703,472 B2
(45) Date of Patent: Jul. 7, 2020

(54) DIRECTIONAL CONTROL FOR COAXIAL ROTARY WING CRAFT

(71) Applicant: Sikorsky Aircraft Corporation, Stratford, CT (US)

(72) Inventor: Mark W. Scott, Bethany, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 342 days.

(21) Appl. No.: 15/534,393

(22) PCT Filed: Nov. 23, 2015

(86) PCT No.: PCT/US2015/062158
§ 371 (c)(1),
(2) Date: Jun. 8, 2017

(87) PCT Pub. No.: WO2016/126304
PCT Pub. Date: Aug. 11, 2016

(65) Prior Publication Data
US 2018/0257771 A1 Sep. 13, 2018

Related U.S. Application Data

(60) Provisional application No. 62/111,748, filed on Feb. 4, 2015.

(51) Int. Cl.
*B64C 27/82* (2006.01)
*B64C 27/10* (2006.01)

(52) U.S. Cl.
CPC .............. *B64C 27/82* (2013.01); *B64C 27/10* (2013.01); *B64C 2027/8236* (2013.01); *B64C 2027/8272* (2013.01); *B64C 2027/8281* (2013.01)

(58) Field of Classification Search
CPC .... B64C 2027/8236; B64C 2027/8272; B64C 27/82; B64C 27/10
See application file for complete search history.

(56) References Cited

U.S. PATENT DOCUMENTS 3,735,945 A   5/1973  Huvers
4,660,785 A   4/1987  Munski
(Continued)

FOREIGN PATENT DOCUMENTS

EP   1724192 A1 * 11/2006  ............. B64C 27/10
EP   1724192 A1   11/2006
(Continued)

OTHER PUBLICATIONS

Notification of Transmittal of the International Search Report and the Written Opinion of the International Searching Authority, or the Declaration for International Application No. PCT/US15/62158; International Filing Date: Nov. 23, 2015; dated Mar. 30, 2016; pp. 1-13.

*Primary Examiner* — Philip J Bonzell
*Assistant Examiner* — Tye William Abell
(74) *Attorney, Agent, or Firm* — Cantor Colburn LLP

(57) ABSTRACT

A rotary winged aircraft includes an airframe and a drive system located at the airframe. A main rotor system is positioned at the airframe and is operably connected to the drive system to provide lift for the rotary winged aircraft. An auxiliary propulsor is located at the airframe and includes a plurality of propeller blades rotatable about a propulsor axis. Collective and cyclic pitch input applied to the auxiliary propeller blades increases yaw performance of the aircraft. A method of operating a rotary wing aircraft includes powering an auxiliary propulsor secured to an airframe of the aircraft and including a plurality of propeller blades rotatable about a propulsor axis. Individual propeller blades are cyclically rotated about their respective propeller blade (Continued)

axes to cyclically change a propeller blade pitch. Rotation of the aircraft about a yaw axis is induced via the collective and cyclic pitch change of the propeller blades.

15 Claims, 3 Drawing Sheets

(56) References Cited

U.S. PATENT DOCUMENTS

| | | | | |
|---|---|---|---|---|
| 7,438,259 B1 * | 10/2008 | Piasecki | ............ | B64C 27/26 |
| | | | | 244/6 |
| 7,584,923 B2 | 9/2009 | Burrage | | |
| 7,967,239 B2 | 6/2011 | Cotton et al. | | |
| 8,403,255 B2 * | 3/2013 | Piasecki | ............ | B64C 3/385 |
| | | | | 244/12.3 |
| 8,788,123 B2 * | 7/2014 | Salesse-Lavergne | ............ | |
| | | | | G05D 1/0088 |
| | | | | 701/4 |
| 2006/0269413 A1 * | 11/2006 | Cotton | ............ | B64C 27/10 |
| | | | | 416/170 R |

FOREIGN PATENT DOCUMENTS

| | | | | | |
|---|---|---|---|---|---|
| GB | 1118117 A | * | 6/1968 | ......... | B64C 27/82 |
| GB | 1118117 A | | 6/1968 | | |
| GB | 1118117 A | * | 6/1986 | ......... | B64C 27/82 |

\* cited by examiner

DIRECTIONAL CONTROL FOR COAXIAL ROTARY WING CRAFT

CROSS REFERENCE TO RELATED APPLICATIONS

This application is a National Stage application of PCT/US2015/062158, filed Nov. 23, 2015, which claims the benefit of U.S. Provisional Application No. 62/111,748, filed Feb. 4, 2015, both of which are incorporated by reference in their entirety herein.

FEDERAL RESEARCH STATEMENT

This invention was made with government support with the United States Army under Contract No. W911W6-13-2-0003. The government therefore has certain rights in this invention.

BACKGROUND

The subject matter disclosed herein generally relates to directional control of aircraft. More specifically, the subject disclosure relates to yaw control of dual coaxial rotor rotary wing aircraft.

A rotary wing aircraft, or helicopter, with a coaxial contra-rotating rotor system is capable of higher speeds as compared to conventional single rotor helicopters due in part to the balance of lift between advancing sides of the main rotor blades on the upper and lower rotor systems. Such aircraft, however, tend to have weak yaw control during hover flight, low speed flight conditions, under low rotor thrust conditions and during autorotational landings. Low speed/low rotor thrust flight conditions are encountered in aircraft return to target and similar "low g" maneuvers. The ability to safely autorotate is an important feature, especially for single engine aircraft. The poor yaw performance is typically due to the inability of the aircraft to create adequate differential rotor torque between the two coaxial rotors under these flight conditions.

BRIEF SUMMARY

In one embodiment, a rotary winged aircraft includes an airframe and a drive system located at the airframe. A main rotor system is positioned at the airframe and is operably connected to the drive system to provide lift for the rotary winged aircraft. An auxiliary propulsor is located at the airframe and includes a plurality of propeller blades rotatable about a propulsor axis. A cyclic pitch input applied to the auxiliary propeller blades increases yaw performance of the aircraft.

Additionally or alternatively, in this or other embodiments the plurality of propeller blades are operably connected to a propeller hub.

Additionally or alternatively, in this or other embodiments the cyclic pitch input results in a moment about the propeller hub.

Additionally or alternatively, in this or other embodiments cyclic and collective pitch inputs result in a net force perpendicular to the propulsor axis.

Additionally or alternatively, in this or other embodiments the cyclic and collective pitch inputs are applied during hover flight, low speed flight conditions, low rotor thrust conditions, or during autorotational landing.

Additionally or alternatively, in this or other embodiments the main rotor system is dual coaxial rotor system.

Additionally or alternatively, in this or other embodiments the auxiliary propulsor is disposed at an extending tail of the airframe.

A method of operating a rotary wing aircraft includes powering an auxiliary propulsor secured to an airframe of the aircraft and including a plurality of propeller blades rotatable about a propulsor axis. The plurality of propeller blades are rotated about the propulsor axis. Individual propeller blades are cyclically rotated about their respective propeller blade axes to cyclically change a propeller blade pitch. Rotation of the aircraft about a yaw axis is induced via the cyclic pitch change of the propeller blades.

Additionally or alternatively, in this or other embodiments the plurality of propeller blades are operably connected to a propeller hub.

Additionally or alternatively, in this or other embodiments the cyclic pitch change results in a moment about the propeller hub.

Additionally or alternatively, in this or other embodiments the cyclic and collective pitch change results in a net force perpendicular to the propulsor axis.

Additionally or alternatively, in this or other embodiments the cyclic pitch change is applied during hover flight, low speed flight conditions, low rotor thrust conditions, or during autorotational landing.

An auxiliary propulsor for a rotary winged aircraft includes a propeller hub and a plurality of propeller blades rotatable about a propulsor axis, such that a cyclic pitch change applied to the auxiliary propeller blades increases yaw performance of the aircraft.

Additionally or alternatively, in this or other embodiments the cyclic pitch change results in a moment about the propeller hub.

Additionally or alternatively, in this or other embodiments the cyclic and collective pitch change results in a net force perpendicular to the propulsor axis.

Additionally or alternatively, in this or other embodiments the cyclic pitch change is applied during hover flight, low speed flight conditions, low rotor thrust conditions or during autorotational landing.

Additionally or alternatively, in this or other embodiments the auxiliary propulsor is located at an extended tail of the rotary wing aircraft.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
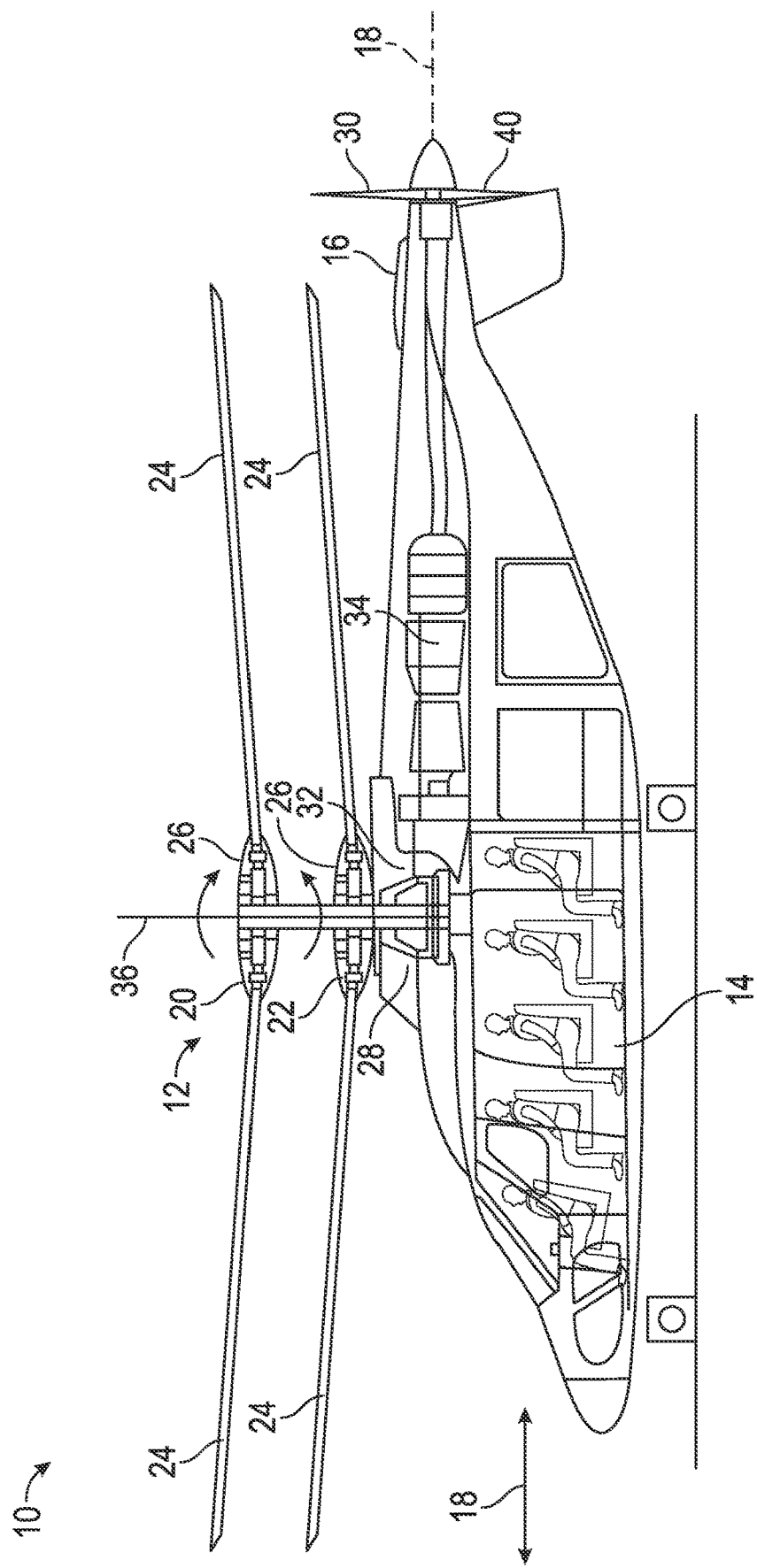
FIG. 1 is a general side view of an exemplary rotary wing aircraft for use in accordance with embodiments.

FIG. 1 illustrates an exemplary vertical takeoff and landing (VTOL) high speed compound or coaxial contra-rotating rigid rotor aircraft 10 having a dual, contra-rotating main rotor system 12, which rotates about a rotor axis 36. The aircraft 10 includes an airframe 14 which supports the dual, contra-rotating, coaxial main rotor system 12 as well as a translational thrust system 16 which provides translational thrust generally parallel to an aircraft longitudinal axis 18.

The main rotor system 12 includes an upper rotor system 20 and a lower rotor system 22 as dual counter rotating main rotors in a coaxial configuration. A plurality of rotor blade assemblies 24 is mounted to a rotor hub assembly 26 of each rotor system 20, 22. The main rotor system 12 is driven by a transmission 28. The translational thrust system 16 may be any propeller system including, but not limited to a pusher propeller, a tractor propeller, a nacelle mounted propeller, etc. In the example of FIG. 1, the translational thrust system 16 includes an auxiliary propulsor 30. In an embodiment, the auxiliary propulsor 30 is a pusher propeller system with a propeller rotational axis oriented substantially horizontal and parallel to the aircraft longitudinal axis 18 to provide thrust for high speed flight. The translational thrust system 16 may be driven through a main gearbox 32 which also drives the main rotor system 12.

The transmission 28 includes the main gearbox 32 driven by one or more engines, illustrated schematically at 34. The main gearbox 32 and engines 34 are considered as part of the non-rotating frame of the aircraft 10. In the case of a rotary wing aircraft, the main gearbox 32 may be interposed between one or more gas turbine engines 34, the main rotor system 12 and the translational thrust system 16. In one embodiment, the main gearbox 32 is a split torque gearbox which carries torque from the engines 34 through a multitude of drivetrain paths. Although a particular rotary wing aircraft configuration is illustrated and described in the disclosed non-limiting embodiment, other configurations and/or machines with rotor systems are within the scope of the present invention. It is to be appreciated that while the description herein relates to a rotary wing aircraft with a dual coaxial contra-rotating rotor system, the disclosure herein may be as readily applied to other rotor systems, such as turboprops, tilt-rotors, and tilt-wing aircraft, or a conventional single rotor system.

Figure 2:
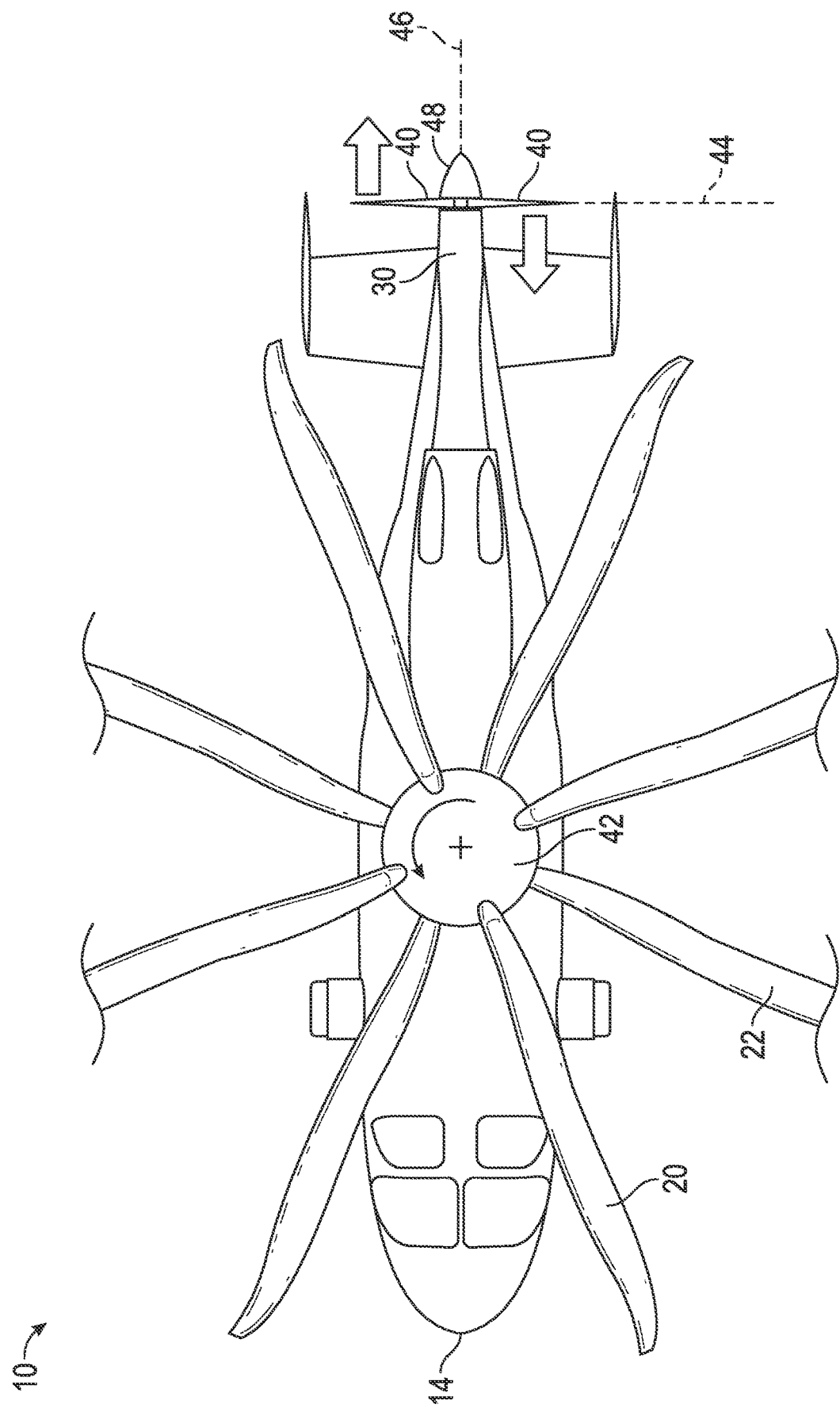
FIG. 2 is a plan view of an embodiment of a rotary winged aircraft.
Figure 3:
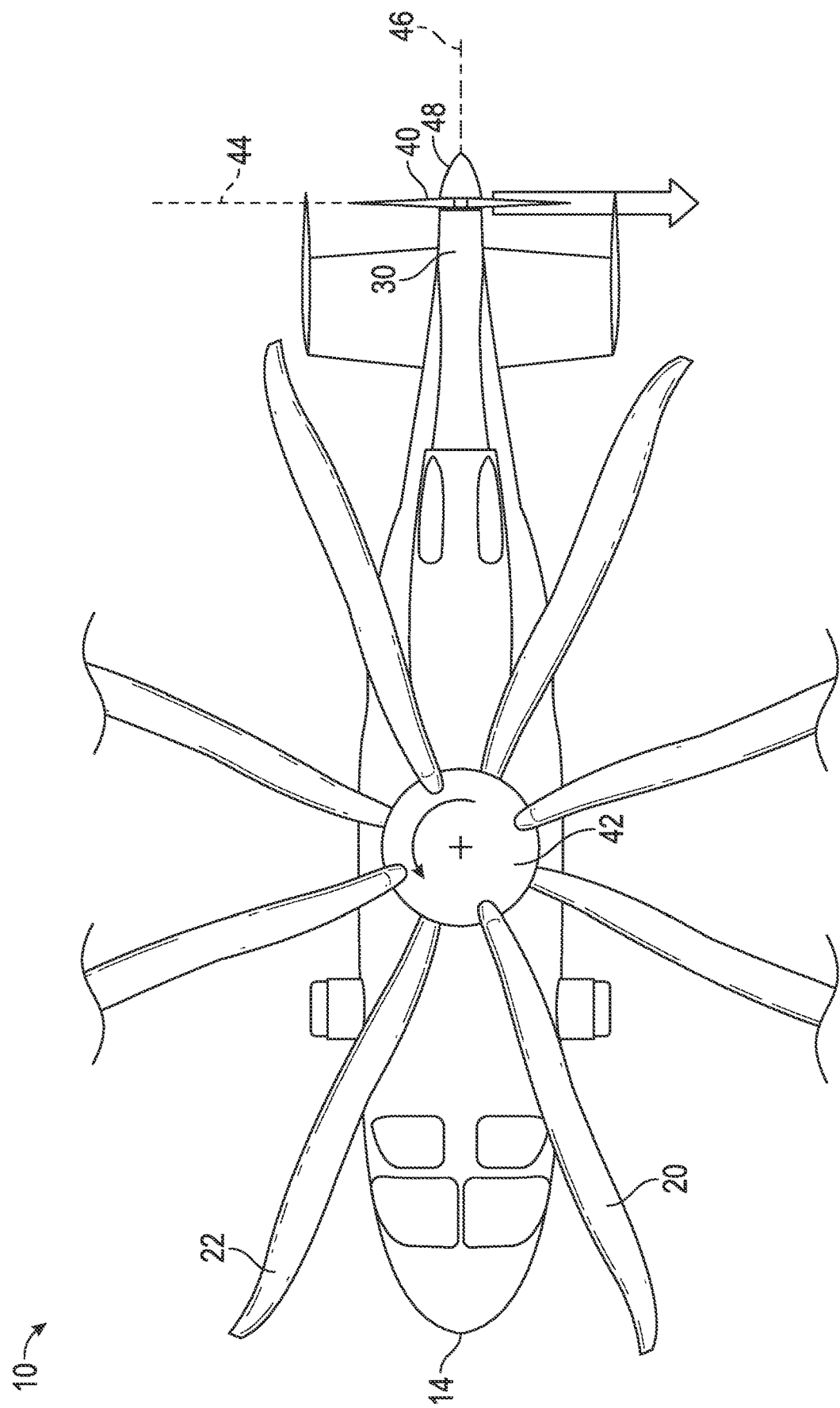
FIG. 3 is a plan view of another embodiment of a rotary winged aircraft.

As stated above, typical aircraft with coaxial counter rotating main rotors have weak yaw control in certain operating conditions. Referring now to FIGS. 2 and 3, in embodiments of the present disclosure, cyclic pitch control is applied to propeller blades 40 of the auxiliary propulsor 30 to improve yaw response about a yaw axis 42 of the aircraft 10 in selected flight conditions including, but not limited to, hover flight, low speed flight conditions, under low rotor thrust conditions, and during autorotational landings. Low speed/low rotor thrust flight conditions are encountered in aircraft return to target and similar "low g" maneuvers. In applying cyclic pitch control, a pitch about a propeller blade axis 44 of each propeller blade 40 is varied as the propeller blade 40 travels about the propeller rotational axis 46.

Referring now to FIG. 2, a symmetric cyclic pitch change input of approximately 10 degrees is utilized to create a pure moment around a propeller hub 48 of the auxiliary propulsor 30 as shown. This moment results in an increase to overall aircraft 10 yaw moment about the yaw axis 42. Thus increasing the yaw rate and overall control.

Referring now to FIG. 3, cyclic and collective pitch input are applied to blades 40 that create flat pitch (near 0 degrees) of propeller blades 40 at one side of the auxiliary propulsor 30, and a coarse pitch of 70 degrees or more at an opposing side of the auxiliary propulsor 30. Collective pitch application in combination with cyclic pitch application is required to create coarse pitch on one half of the propulsor and flat pitch on the other. The coarse pitch blades on one half of the propulsor 30 creates very high drag because they are stalled which far exceeds the blade drag force on the opposite side of the propulsor 30 at flat pitch. The result is a substantial net force perpendicular to the propeller rotational axis 46 as shown in FIG. 3. The magnitude of force depends on the difference in pitch between propeller blades 40 on the opposing sides of the auxiliary propulsor 30, while the direction of the force depends on which side of the auxiliary propulsor 30 the coarse pitch is applied to. The large force perpendicular to the rotational axis 46 at a distance from the yaw axis 42 creates the additional aircraft yawing moment.

The difference between the modes of FIGS. 2 and 3 is a magnitude of the pitch change. Determination of the best mode depends on particular aircraft and propulsor characteristics such as propulsor distance from the rotor axis 42, propulsor diameter, blade area, and tip speed. Aircraft design yaw control requirements also has impact on selection on the best mode of operation.

Utilizing cyclic pitch input at the auxiliary propulsor 40 results in increased yaw control of the aircraft 10 throughout its flight envelope. This disclosure eliminates the need for ancillary devices, such as an auxiliary tail rotor, which are heavy and increase drag on the aircraft. It also eliminates the need for rotor blown control surfaces that are not only heavy and draggy but also of limited value in low speed and hovering flight due to low velocity airflow.

While the invention has been described in detail in connection with only a limited number of embodiments, it should be readily understood that the invention is not limited to such disclosed embodiments. For instance, while described in terms of aircraft, it is understood that aspects could be used in other contexts such as for wind turbines, maritime propulsion, or other technologies in which a rotating element's plane of rotation will vary from perpendicular with the axis of rotation of a shaft driving the rotating element. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotary wing aircraft comprising:
    an airframe;
    a drive system disposed at the airframe;
    a main rotor system disposed at the airframe and operably connected to the drive system to provide lift for the rotary wing aircraft, the main rotor system comprising coaxial counter rotating main rotors; and
    an auxiliary propulsor disposed at the airframe including a plurality of propeller blades rotatable about a propulsor axis, such that a combination of collective and cyclic pitch applied to the plurality of propeller blades increases yaw performance of the rotary wing aircraft, wherein the collective and cyclic pitch results in a net force perpendicular to the propulsor axis.
2. The rotary wing aircraft of claim 1, wherein the collective and cyclic pitch change is applied during autorotational landing.

3. The aircraft of claim 1, wherein the collective and cyclic pitch are applied during one of hover flight, return to target maneuvers, or autorotational landing.

4. The aircraft of claim 1, wherein the main rotor system is a dual coaxial rotor system.

5. The aircraft of claim 1, wherein the auxiliary propulsor is disposed at an extended tail of the airframe.

6. The aircraft of claim 1, wherein the plurality of propeller blades are operably connected to a propeller hub.

7. The aircraft of claim 6, wherein the cyclic pitch results in a moment about the propeller hub.

8. A method of operating a rotary wing aircraft comprising:
   powering an auxiliary propulsor secured to an airframe of the rotary wing aircraft and including a plurality of propeller blades rotatable about a propulsor axis, the rotary wing aircraft comprising coaxial counter rotating main rotors;
   rotating the plurality of propeller blades about the propulsor axis;
   cyclically rotating individual propeller blades about their respective propeller blade axes to cyclically change a propeller blade pitch; and
   inducing rotation of the rotary wing aircraft about a yaw axis via the collective and cyclic pitch change of the propeller blades to increase yaw performance of the rotary wing aircraft, wherein the collective and cyclic pitch results in a net force perpendicular to the propulsor axis.

9. The method of claim 8, further comprising applying the collective and cyclic pitch change during one of hover flight, return to target maneuvers, or autorotational landing.

10. The method of claim 8, wherein the plurality of propeller blades are operably connected to a propeller hub.

11. The method of claim 10, wherein the cyclic pitch change results in a moment about the propeller hub.

12. An auxiliary propulsor for a rotary wing aircraft comprising:
    a propeller hub, the rotary wing aircraft comprising coaxial counter rotating main rotors; and
    a plurality of propeller blades rotatable about a propulsor axis, such that a cyclic pitch change applied to the plurality of propeller blades increases yaw performance of the rotary wing aircraft, wherein the collective and cyclic pitch results in a net force perpendicular to the propulsor axis.

13. The auxiliary propulsor of claim 12, wherein the cyclic pitch change results in a moment about the propeller hub.

14. The auxiliary propulsor of claim 12, wherein the collective and cyclic pitch change is applied during one of hover flight, return to target maneuvers, or autorotational landing.

15. The auxiliary propulsor of claim 12, wherein the auxiliary propulsor is disposed at an extending tail of the rotary wing aircraft.

* * * * *